No. 826,581. PATENTED JULY 24, 1906.
J. H. KINEALY.
AUTOMATIC RETURN VALVE FOR HEATING APPARATUS.
APPLICATION FILED FEB. 3, 1905.

No. 826,581. PATENTED JULY 24, 1906.
J. H. KINEALY.
AUTOMATIC RETURN VALVE FOR HEATING APPARATUS.
APPLICATION FILED FEB. 3, 1905.

2 SHEETS—SHEET 2.

WITNESSES:
INVENTOR
John N. Kinealy
BY
ATTORNEY.

UNITED STATES PATENT OFFICE.

JOHN H. KINEALY, OF ST. LOUIS, MISSOURI.

AUTOMATIC RETURN-VALVE FOR HEATING APPARATUS.

No. 826,581.  Specification of Letters Patent.  Patented July 24, 1906.

Application filed February 3, 1905. Serial No. 243,932.

*To all whom it may concern:*

Be it known that I, JOHN H. KINEALY, of the city of St. Louis and State of Missouri, have invented an Improvement in Automatic Return-Valves for Heating Apparatus, of which the following is a specification.

In modern steam-heating practice it is usual to remove the air and water of condensation from the radiators, heaters, or coils by the maintenance of a lower pressure or suction in the returns. It is necessary in such systems that means shall be employed to so control the discharge of the air and water of condensation that the escape of uncondensed steam may be prevented. Automatic motor-valves actuated by the differential pressure on the inlet and outlet sides of the valve, the creation of which differential is controlled by the conditions, such as the accumulation of water, existing on the inlet side, have heretofore been successfully used for this purpose; but in all such devices the differential pressure was utilized to act directly on a valve controlling pressure-motor and move it in the direction of least pressure to open the valve. The operation, therefore, was directly dependent upon the amount of differential produced.

While in the present invention I utilize a differential pressure controlled by the conditions existing on the inlet side of the valve, such differential pressure is not employed to act directly upon the pressure-motor and move it in the direction of least pressure, but is employed as the means of impelling a column formed of the water of condensation in the valve-body against the motor, which by its impact actuates the motor in the direction of greatest pressure in a manner somewhat similar to the actuation of a hydraulic ram.

The valve is actuated not by the hydrostatic head or pressure nor directly by a differential pressure, but by the impact of a surging body of water actuated by the differential. It may therefore be termed a "hydro-impact" valve.

The valve is not only positive and reliable in its action, but responds very quickly and prevents the accumulation of any material quantity of water of condensation, and since the movement does not depend upon the direct action of the differential pressure it is necessary to produce only that differential required to actuate the water column.

Figure 1:
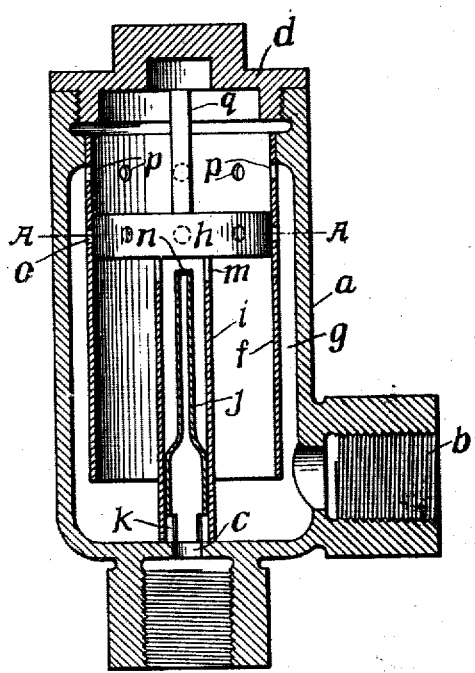
Figure 2:
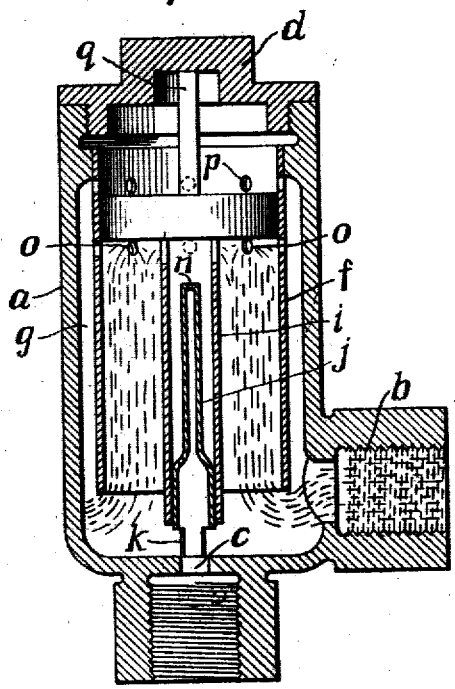
Figure 3:
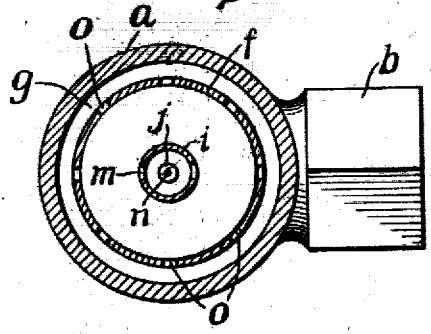
Figure 4:
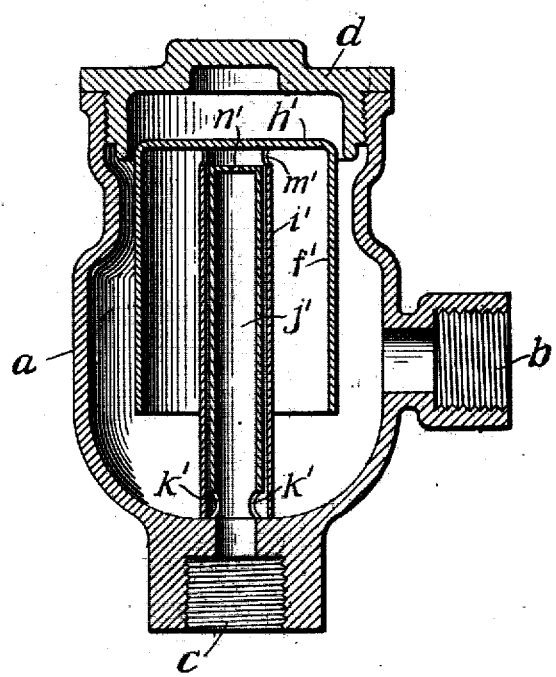

In the drawings, Figure 1 is a vertical sectional view of the valve, showing the same closed to the passage of water of condensation. Fig. 2 is a similar view showing the valve opened for the discharge of the water. Fig. 3 is a horizontal section on the line A A of Fig. 1 with the motor removed; and Fig. 4 is a vertical sectional view similar to Fig. 1, showing another form of the valve.

Referring first to the construction shown in Figs. 1 to 3, $a$ is the usual valve-body having an inlet $b$ and an outlet $c$, the former being connected in practice with the radiator or heater and the latter with the return-pipe. For convenience of construction and to give access to the interior, the body $a$ is shown open at the top and provided with a threaded cap $d$. $f$ is a cylinder carried by the valve-body $a$ at the top and extending down below the inlet $b$ above the outlet and forming with the walls of the valve-body an annular space $g$. Inside of this cylinder $f$ is a piston $h$, carrying a tube $i$, which embraces a tube $j$, extending upward from the outlet $c$ and provided at the lower end with ports $k$, which form the communication between the outlet $c$ and the interior of the valve-body. When the piston $h$ is in its lowest position, as shown in Fig. 1, the tube $i$ rests on the base-wall of the valve-body and closes the ports $k$. The upper end of the tube $i$ is provided with ports $m$, and the tubular guide $j$ is provided at the top or upper part with a small air-vent $n$. The cylinder $f$ is provided with one or more openings $o$, so located as to be closed by the piston $h$ when in its lowest position, as shown in Fig. 1, but to be opened when the piston is moved into its highest position, as shown in Fig. 2. The cylinder is also provided with other openings $p$, located above the piston. $q$ is a stop-pin carried by the upper side of the piston, which is adapted to strike the cap $d$ and prevent the piston rising far enough to close the upper openings $p$. As shown, the tube $j$ is enlarged at the bottom to afford ports $k$ of sufficient area to allow the water of condensation to flow freely to the outlet $c$.

When the valve is substantially free from water of condensation—i. e., when the level of the water is below the end of the cylinder $f$—the air, steam, and uncondensed vapors will pass both down under the cylinder and act on the lower face of the piston and also up through the space $g$ outside of the cylinder and through the upper openings $p$ and act upon the upper face of the piston. There is then a balanced pressure acting on the piston, and there will be no movement. The tube $i$ closes the ports $k$, and the air and uncondensed vapors will pass through the openings $m$ into the tube $i$ and thence through the air-vent $n$ and tube $j$ out through the outlet $c$. The vent $n$ is so small that there will be no appreciable waste of steam. When, however, water of condensation accumulates in sufficient volume in the valve to rise above the end of the cylinder, the space within the cylinder below the piston will become sealed, and the extraction of the air and vapors through the vent $n$ will result in the production of a lower pressure on the lower side of the piston. The natural result of this unbalancing the pressure on the piston would be to move the piston in the direction of least pressure; but as the piston is held against movement in that direction by the tube $i$, which rests on the base-wall of the valve-body, this result cannot take place, and consequently the water in the lower part of the valve-body will surge forward in the cylinder and by its impact on the lower side of the piston will push the piston upward and open the ports $k$ $k$. The valve is shown in this position in Fig. 2. This tube $i$, which thus controls the ports $k$, acts as the valve-piece to control the outlet. As the upward movement of the piston has opened the openings $o$, the equilibrium of pressures will be restored, and the water may flow out through the ports $k$, while the piston returns to its first position and the tube $i$ again closes the ports $k$.

The action of the water upon the piston is similar to that in a hydraulic ram and is very quick and positive, so that the valve must respond immediately to the accumulation of water of condensation. Furthermore, as the opration takes place as soon as the water reaches a level above the bottom of the cylinder $f$, a small accumulation is sufficient to actuate it.

In the practical operation of the valve under normal conditions it is alternately opening and closing, and no material accumulation of water is permitted.

The stop $q$ prevents the piston rising high enough to close the openings $p$, as that would prevent the production of the equilibrium.

A modified construction, but one involving the same essential characteristics, is shown in Fig. 4. In this case the fixed cylinder $f$, with its ports $o$ $p$, is dispensed with, and instead thereof the motor consists of an inverted bucket $h'$, the depending walls $f'$ of which take the place of the cylinder. This bucket is provided with a tube $i'$, similar to the tube $i$ of the other form, having similar openings $m'$ below the base of the bucket, and the tube $i'$ embraces a tube $j'$, communicating with the outlet $c$ and having ports $k'$ at the base and an air-vent $n'$ at the top. When the valve is closed, as in Fig. 4, the end of the tube $i'$ rests on the base of the valve-body and closes the ports $k'$. In the absence of a material accumulation of water of condensation air, steam, and uncondensed vapors will pass under the depending wall of the bucket and thence up inside of the bucket and out through the openings $m'$ and vent $n'$ to the tube $j'$ and outlet $c$. As the pressures acting on the opposite sides of the bucket are equal, there will be no movement. When, however, water of condensation accumulates in sufficient quantity to seal the lower edge of the bucket, the extraction of air from the space within the bucket will cause the surging upward of the water, which by its impact on the base of the bucket will lift it and open the ports $k'$ in the same manner as that described in connection with the piston and fixed cylinder construction shown in Figs. 1, 2, and 3. In this case as the tube $j'$ acts as a guide for the tube $i'$ of the bucket it must be of sufficient diameter to fit the tube $i'$ and prevent lateral displacement when the bucket rises. As the movement of the motor is caused by the impact of the volume of water which surges forward in the cylinder or bucket, the valve-body must be of sufficient size relatively to the diameter and length of the cylinder or bucket to contain a sufficient quantity of water to provide the required volume of surging liquid to operate the motor without breaking the water seal. In either construction the wall $f$ or $f'$ constitutes a motor-chamber adapted to be sealed by an accumulation of water of condensation, and in the motor-chamber thus sealed the differential is produced, which causes the water to surge against the motor and operate it by impact.

What I claim as new, and desire to secure by Letters Patent, is as follows:

1. An automatic valve for steam-heating apparatus, consisting of a valve-body having an inlet and an outlet, a valve-piece to control the outlet, means within the valve-body controlling said valve-piece and actuated against the pressure in the inlet side of the valve by the impact of water of condensation accumulated in the valve-body when said valve-piece is closed, and means controlled by the accumulation of water of condensation to create a differential pressure between said water and said means to control the valve-piece, thereby causing said water to make impact against said means to control the valve-piece, substantially as described.

2. An automatic valve for steam-heating apparatus, consisting of a valve-body having an inlet and an outlet, a valve-piece to control said outlet, a motor controlling said valve-piece, and means controlled by the accumulation of water of condensation in the valve-body to create a differential pressure between the water and the motor, thereby causing said water to make impact against said motor and operate it against the pressure in the inlet side of the valve, substantially as described.

3. An automatic valve for steam-heating apparatus, consisting of a valve-body having an inlet and an outlet, a valve-piece to control said outlet, a motor controlling said valve-piece, a passage connecting one side of the motor with the outlet beyond the valve-piece, and means to form a water seal by the accumulation of water in the valve-body whereby a differential pressure may be created between the water and that side of the motor connected to the outlet, thereby causing the water to make impact against said motor and operate it against the pressure in the inlet side of the valve, substantially as described.

4. An automatic valve for steam-heating apparatus, consisting of a valve-body having an inlet and an outlet, a valve-piece to control said outlet, a motor to control said valve-piece, a motor-chamber open at the bottom and adapted to be sealed by an accumulation of water of condensation, and a passage connecting said motor-chamber with the outlet beyond the valve-piece, whereby a differential pressure may be created in said motor-chamber on the formation of a water seal, thereby causing the water to surge forward into said motor-chamber and operate by impact the motor against the pressure in the inlet side of the valve, substantially as described.

5. An automatic valve for steam-heating apparatus, consisting of a valve-body having an inlet and an outlet, a valve-piece to control said outlet, a motor to control said valve-piece, a motor-chamber open at the bottom and adapted to be sealed by an accumulation of water of condensation, and a vent whereby a differential pressure may be created in said motor-chamber on the formation of a water seal, thereby causing the water to surge forward into said motor-chamber and operate by impact the motor against the pressure in the inlet side of the valve, substantially as described.

6. An automatic valve for steam-heating apparatus, consisting of a valve-body having an inlet and an outlet, a valve-piece to control the outlet, a motor to control the valve-piece, said motor being within the valve-body and subject to the pressure in the inlet side thereof, and means controlled by the accumulation of water of condensation to create a differential pressure between the water and said motor, thereby causing the motor to be operated by impact of said water against the pressure prevailing in the inlet side of the valve, substantially as described.

7. An automatic valve for steam-heating apparatus, consisting of a valve-body having an inlet and an outlet, an inverted bucket in said valve-body, supported thereby against movement in one direction and adapted to be sealed by an accumulation of water of condensation, a vent arranged to vent the interior of said bucket without venting the space outside of the bucket when said bucket is sealed, and a valve-piece to control the outlet, said valve-piece being controlled by said bucket, substantially as described.

8. An automatic valve for steam-heating apparatus, consisting of a valve-body having an inlet and an outlet, a motor in said valve-body, a motor-chamber open at the bottom and adapted to be sealed by an accumulation of water of condensation, a tube carried by said motor and closing the outlet, said tube having an air-vent from the outlet into the upper part of the motor-chamber, and a guide for said tube carried by the valve-body and consisting of a tube having at its lower part ports communicating with the outlet and controlled by the tube carried by the motor and a vent in its upper part communicating with the interior of said motor-tube.

9. An automatic valve for steam-heating apparatus, consisting of a valve-body having an inlet and an outlet, an inverted bucket in said valve-body, supported thereby against movement in one direction and adapted to be sealed by an accumulation of water of condensation, an air-passage between the outlet and the interior of said bucket, and a valve-piece, to control the outlet, controlled by said bucket.

10. An automatic valve for steam-heating apparatus consisting of a valve-body having an inlet and an outlet, a tube extending from said outlet and provided at its lower end with ports communicating with the outlet and at its upper end with a vent, an inverted bucket adapted to be sealed by an accumulation of water of condensation, and a tube carried by said bucket, surrounding said first tube and closing the ports therein, and supporting the bucket against movement in one direction, said tube having an air-vent in its upper end into the interior of the bucket.

In testimony of which invention I hereunto set my hand.

JOHN H. KINEALY.

Witnesses:
CLIFFORD R. BELL,
FLORENCE UETZ.